United States Patent
Dale et al.

(10) Patent No.: US 10,603,629 B2
(45) Date of Patent: Mar. 31, 2020

(54) MERCURY EMISSION CONTROL FROM A WET FLUE GAS SCRUBBER

(71) Applicant: General Electric Company, Schenectady, NY (US)

(72) Inventors: Trevor James Dale, Trevose, PA (US); Raymond Gansley, Knoxville, TN (US); Pererik Appelo, Knoxville, TN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/305,276

(22) PCT Filed: May 26, 2017

(86) PCT No.: PCT/US2017/034600
§ 371 (c)(1),
(2) Date: Nov. 28, 2018

(87) PCT Pub. No.: WO2017/222741
PCT Pub. Date: Dec. 28, 2017

(65) Prior Publication Data
US 2019/0388833 A1  Dec. 26, 2019

Related U.S. Application Data

(60) Provisional application No. 62/353,738, filed on Jun. 23, 2016.

(51) Int. Cl.
*B01D 53/34* (2006.01)
*B01D 53/50* (2006.01)
(Continued)

(52) U.S. Cl.
CPC ......... *B01D 53/346* (2013.01); *B01D 53/502* (2013.01); *B01D 53/64* (2013.01);
(Continued)

(58) Field of Classification Search
CPC .. B01D 53/64; B01D 53/78; B01D 2257/602; B01D 2258/0283; B01J 10/00;
(Continued)

(56) References Cited

U.S. PATENT DOCUMENTS

| | | |
|---|---|---|
| 5,672,323 A | 9/1997 | Bhat et al. |
| 6,284,199 B1 | 9/2001 | Downs et al. |

(Continued)

FOREIGN PATENT DOCUMENTS

| | | |
|---|---|---|
| EP | 1 040 864 A2 | 10/2000 |
| EP | 2 240 258 B1 | 10/2010 |

(Continued)

OTHER PUBLICATIONS

International Search Report and Written Opinion dated Aug. 22, 2017 in PCT/US2017/034600 filed May 26, 2017.

*Primary Examiner* — Timothy C Vanoy
(74) *Attorney, Agent, or Firm* — Wegman Hessler

(57) ABSTRACT

Methods and systems for control and adjustment of the feed rate of mercury reemission control additives (MECA) to a wet flue gas desulfurization system. Predetermined sulfite concentration values are compared to actual sulfite concentrations measured in the scrubber liquid. The MECA feed to the recirculating scrubber liquor is then adjusted and regulated as a result of such comparisons.

24 Claims, 1 Drawing Sheet

(51) Int. Cl.
*B01D 53/64* (2006.01)
*B01D 53/80* (2006.01)
*F23J 15/04* (2006.01)

(52) U.S. Cl.
CPC .............. *B01D 53/80* (2013.01); *F23J 15/04* (2013.01); *B01D 2251/11* (2013.01); *B01D 2251/404* (2013.01); *B01D 2257/302* (2013.01); *B01D 2257/602* (2013.01)

(58) Field of Classification Search
CPC ...... B01J 19/00; B01J 19/0006; B01J 19/002; B01J 19/0033; B01J 2219/00049; B01J 2219/00164; B01J 2219/00182; B01J 2219/00186; B01J 2219/00272; B01J 2219/00698; B01J 2219/00957
See application file for complete search history.

(56) References Cited

U.S. PATENT DOCUMENTS

| | | | |
|---|---|---|---|
| 6,328,939 B1 | 12/2001 | Amrhein | |
| 6,503,470 B1 | 1/2003 | Nolan et al. | |
| 6,808,692 B2 | 10/2004 | Oehr | |
| 6,878,358 B2 | 4/2005 | Vosteen et al. | |
| 7,037,474 B2 | 5/2006 | Nolan et al. | |
| 8,069,797 B2 | 12/2011 | Srinivasachar et al. | |
| 8,110,163 B2 | 2/2012 | Keiser et al. | |
| 8,632,742 B2 | 1/2014 | Keiser et al. | |
| 8,828,341 B1* | 9/2014 | Appelo | B01D 53/64 423/108 |
| 9,034,285 B1 | 5/2015 | McCullough et al. | |
| 9,440,183 B2* | 9/2016 | Brogaard | B01D 53/346 |
| 2012/0321539 A1* | 12/2012 | Steen | B01D 53/501 423/243.01 |
| 2013/0149206 A1* | 6/2013 | Ukai | B01D 53/64 422/170 |
| 2014/0246333 A1 | 9/2014 | Stiles et al. | |
| 2014/0255280 A1 | 9/2014 | McCullough et al. | |
| 2018/0236400 A1* | 8/2018 | Nilsson | F23J 15/04 |

FOREIGN PATENT DOCUMENTS

| | | | | |
|---|---|---|---|---|
| EP | 3 144 051 A1 * | 3/2017 | | B01D 53/34 |
| EP | 3 144 051 B1 * | 4/2019 | | B01D 53/34 |
| JP | H0523662 A | 2/1993 | | |
| KR | 2008 0040597 A | 5/2008 | | |
| WO | WO 2009/076253 A1 | 6/2009 | | |

* cited by examiner

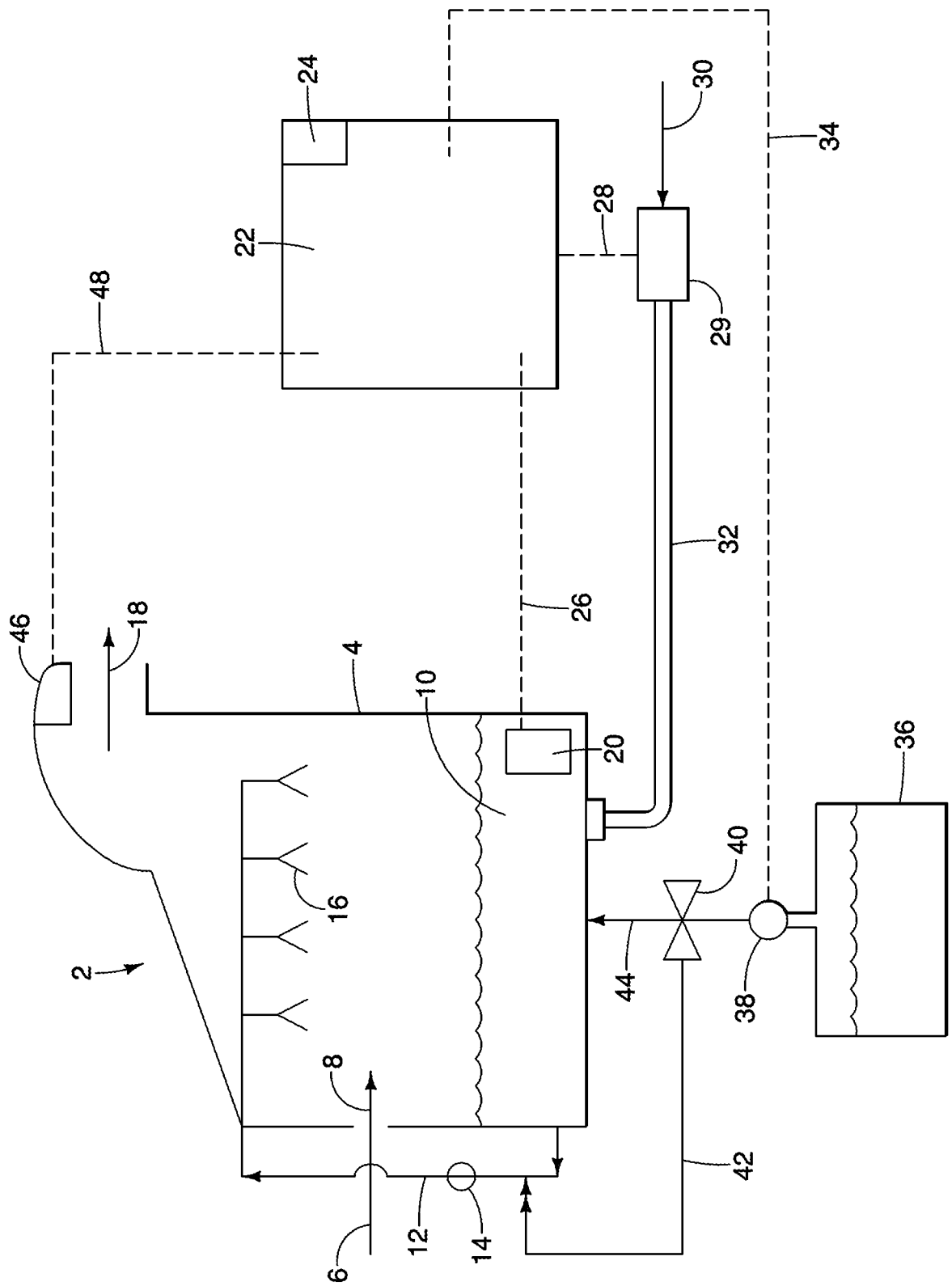

MERCURY EMISSION CONTROL FROM A WET FLUE GAS SCRUBBER

CROSS-REFERENCE TO RELATED APPLICATIONS

This application claims priority to PCT Appl. Ser. No. PCT/US2017/034600, filed May 26, 2017, which claims the benefit of U.S. Provisional Application Ser. No. 62/353,738, filed Jun. 23, 2016, the entireties of which are incorporated herein by reference.

FIELD OF INVENTION

The invention pertains to methods and systems that control and adjust the feed of mercury re-emission control additives (MECA) to a wet flue gas desulfurization (WFGD) system. Predetermined sulfite concentration values are compared to actual sulfite concentrations in the scrubber liquor, and MECA feed to the aqueous scrubber medium is then adjusted and regulated as a result of such comparisons.

BACKGROUND OF THE INVENTION

Governmental regulations strictly limit the amount of mercury emissions in flue gas emanating from boilers burning carbonaceous and other fuels. Combustion gases exiting the boiler may contain mercury in three forms: particulate, oxidized, and elemental. Particulate mercury can be captured by particulate control devices such as electrostatic precipitators (ESPs) and fabric filters (FF). Oxidized mercury is water soluble and as such WFGDs can absorb the oxidized mercury from the combustion gas into the liquid phase. Elemental mercury, which is insoluble in water, is difficult to capture using existing air quality control devices. Consequently, mechanical methods such as fixed bed catalysts (e.g., SCRs), and chemical additives (e.g., calcium bromide, hydrogen bromide, magnesium chloride, ammonium halides) have been developed that oxidize elemental mercury in the gas phase for subsequent capture with a WFGD. The captured mercury leaves the process via a WFGD purge stream, blow down, or with the solid gypsum by-product.

Since oxidized mercury is water soluble, the WFGD scrubbing liquor captures much of it. However, in some cases, the oxidized mercury is reduced to elemental Hg which is not soluble in the scrubber liquor. The simplified reaction may be expressed by:

$$Hg^{2+} \rightarrow Hg^0$$

This results in an increase of elemental Hg exiting the WFGD in the scrubbed gas and thus a decrease in overall total mercury capture as measured from the carbonaceous fuel to the cleaned stack gas. This reduction of oxidized mercury to elemental mercury in the scrubber and subsequent release is known in the industry as mercury re-emission.

WFGD scrubbers that operate with limestone or lime reagent/aqueous scrubbing liquors include oxidation systems to allow production of a gypsum byproduct. In some cases, sulfite concentration level is monitored and is used to control the amount of oxidation air being fed to the absorber reaction tank to maintain a controlled sulfite level in the slurry. Under such a sulfite control program, it has been shown that mercury emissions are significantly reduced when a small residual sulfite level is maintained in the scrubber slurry, such as, for example 5-100 ppm $SO_3^{-2}$.

However, if the plant is varying fuel load or the sulfur content is varying, and the oxidation air cannot be modulated down to a low enough feedrate when the plant is operated at low load, the sulfite residual can be lost (sulfite concentration goes to a level of 10 to 0 ppm as further oxidation occurs). When the sulfite residue is low, ionic mercury that is soluble in the scrubber medium can be reduced to elemental mercury. Since the elemental mercury is insoluble in the scrubber liquor, it partitions to the gas phase, increasing mercury emission with the flue gas.

SUMMARY OF THE INVENTION

The invention pertains to control of mercury emissions and re-emissions from industrial plants such as fossil fuel fired plants that employ a WFGD to scrub $SO_2$ from the flue gas. These fossil fuels may, for example include coal, oil, bio-mass etc. fuels. Certain embodiments are directed to a treatment program in which sulfite concentration of the scrubber liquor is monitored in order to control and regulate feed of MECA to the liquor. In other embodiments, sulfite concentration of the liquor is monitored to control and regulate both the amount of oxidation air admitted to the system and the MECA feed to the WFGD system.

In certain aspects of the invention, a method is provided for reducing mercury emission or re-emission levels in cleaned combustion flue gas. The method may comprise supplying a combustion flue gas to a WFGD system for contact with an aqueous alkaline slurry to reduce contaminants from the flue gas to produce a cleaned flue gas. Sulfite concentration is measured using a sulfite sensor in the WFGD system and the measured sulfite content is compared to a predetermined sulfite concentration level. In response to this comparison, adjustment is then made to the amount of MECA fed to the slurry. As used herein, the term sulfite sensor or sulfite monitor refers to any device or measuring scheme that measures the sulfite level of the slurry and provides a signal for a controller or the like.

In certain embodiments, the amount of MECA fed to the system is adjusted by regulating the feed of MECA to a reservoir containing the slurry liquor. In some embodiments, the adjustment of the amount of MECA fed to the slurry comprises regulating feed of the MECA to a slurry duct in fluid communication with nozzles or the like positioned in the WFGD system that are adapted to spray the aqueous alkaline slurry to contact the combustion flue gas.

The instant invention can use varied set points for the sulfite level and the MECA addition level. One scenario for an appropriate sulfite level is between 3 ppm and 100 ppm of sulfite in the slurry. A preferred range of 10 ppm to 70 ppm may be used. A single sulfite set point, for instance 25 ppm may be used, or a range for the sulfite level may be used, for instance between 20 to 50 ppm of sulfite. Operating with sulfite levels 200 ppm and even higher can be acceptable for benefits of Hg control purposes. A sulfite set point of 200 ppm has been tested and has demonstrated significant mercury re-emission inhibition, however, there may be negative side effects with operating at high sulfite levels above 200 ppm in a forced oxidation scrubber. For instance, if a plant is producing a by-product of gypsum for sale there may result some degree of degradation in the gypsum purity due to an increase in calcium sulfite solids in the by-product. Also, operating the WFGD slurry at high sulfite levels above 200 ppm may create a phenomenon known as sulfite blinding where a portion of the sulfite in the slurry precipitates as calcium sulfite on the limestone or lime reagent and diminishes the reagent dissolution rate resulting in reduced acid gas removal by the WFGD.

MECA addition rates can be adjusted in numerous ways relative to the operating sulfite level and/or the mercury re-emission and/or the mercury emissions observed. One approach is to determine with no sulfite control (sulfite levels at or approaching zero), a full MECA addition rate (FMAR) that provides desired mercury control. Then, the control system can be operated to adjust the fraction of the FMAR relative to the actual operating sulfite level. Here, it is expected that the actual operating sulfite level measured will have a degree of fluctuation and that the control system can be programmed to determine an average value over a period of time, for instance 1 minute or 5 minutes or 10 minutes, etc.

In one preferred mode of operation, the MECA addition rate can be set to a level of 0 to 25% of the FMAR when the measured sulfite concentration is at the set point or within the desired set point range, if the sulfite level falls (for example, due to limitations in ability to control the oxidation air) to below the set point (set point range), for example, a sulfite set point range of 20 to 50 ppm is desired, but the actual sulfite level is between 10 and 20, the MECA addition rate can be set to 10 to 70% of the FMAR. Similarly, if the actual operating sulfite level is still lower compared to the set point (set point range) for example, a sulfite set point range of 20 to 50 ppm is desired, but the actual sulfite level is between 5 to 10 ppm, then the MECA addition rate can adjust to feed 25 to 100% of MECA. Still further, the sulfite set point range is 20 to 50 ppm of sulfite but the actual operating sulfite level is less than 5 ppm, then the MECA addition rate can be set to 50 to 100% of the FMAR. The above is just one possible illustration of ranges that may be selected for the desired sulfite set point range. In addition the actual MECA addition rates may be further adjusted based on observed mercury emission or re-emission levels. It is expected that MECA addition rate adjustment due to observed mercury emission or re-emission levels will be minimized when the sulfite level is within or near the desired sulfite set point (set point range), but the MECA addition rate adjustment would be allowed to be greater as the actual sulfite level was lower compared to the desired sulfite set point (set point range).

In certain embodiments, the sulfite concentration is measured and compared to a first predetermined sulfite concentration level. Then, the amount of oxidation air fed to the WFGD system is adjusted in response to the comparison made between the actual sulfite concentration in the liquor and the first predetermined sulfite concentration level. Further, in certain aspects of the invention, a second predetermined sulfite concentration level correlated to a desired amount of MECA in the slurry is determined. The actual sulfite concentration in the slurry is compared to this second predetermined sulfite concentration level and the amount of MECA fed to the slurry is adjusted in response to this second comparison.

Other aspects of the invention pertain to systems for reducing mercury emission or re-emission levels in a clean combustion flue gas. The system, in certain aspects, comprises a WFGD system having an aqueous alkaline slurry therein to contact combustion flue gas that is flowing through the WFGD system. A slurry reservoir is provided for collecting the aqueous/alkaline slurry following contact with the combustion flue gas. A sulfite monitor is provided in fluid contact with the slurry in the reservoir for measuring actual sulfite concentration of the aqueous alkaline slurry to obtain a measured sulfite concentration. A control device is provided that receives a signal from the sulfite monitor corresponding to the actual measured sulfite concentration. The control device is adapted to compare the actual sulfite concentration measurement to a predetermined sulfite concentration, the latter of which is correlated to a desired amount of MECA in the aqueous alkaline slurry. A MECA feed mechanism is provided that is controlled by the control device to adjust the feed of MECA to the aqueous alkaline slurry in response to comparison of the actual sulfite concentration to the predetermined sulfite concentration.

In certain embodiments, the MECA feed mechanism comprises a pump in fluid communication with a MECA reservoir and the slurry liquor reservoir for pumping MECA from the MECA reservoir to the slurry reservoir. In some aspects of the invention, the MECA feed mechanism comprises pumping MECA from the MECA reservoir to a slurry duct in fluid communication with spray nozzles to spray MECA containing slurry into contact with the combustion flue gas as it flows through the WFGD system. In certain exemplary embodiments, the MECA feed system comprises a pump in fluid communication with the MECA reservoir and the slurry duct to pump MECA from the MECA reservoir to the slurry duct.

In some exemplary embodiments, a slurry reservoir is provided for collecting the aqueous alkaline slurry liquor following contact with the combustion flue gas. A sulfite monitor is provided in fluid contact with the reservoir for measuring actual sulfite concentration of the slurry liquor. A control device is provided to receive a signal from the sulfite monitor corresponding to the measured sulfite concentration, and this control device is adapted to compare the measured sulfite concentration measurement to a first predetermined sulfite concentration that is correlated to a desired amount of oxidation air that is fed to the system. The control device also is adapted to compare the measured sulfite concentration measurement to a second predetermined sulfite concentration that is correlated to a desired amount of MECA in the aqueous alkaline slurry. An oxidation air feed mechanism is controlled by the control device to adjust the feed of oxidation air to the WFGD system in response to comparison of the measured sulfite concentration measurement to the first predetermined sulfite concentration. A MECA feed mechanism controlled by the control device is provided to adjust the feed of MECA to the aqueous alkaline slurry in response to comparison of the measured sulfite concentration to the second predetermined sulfite concentration.

BRIEF DESCRIPTION OF THE DRAWINGS

For the purposes of illustrating the subject matter disclosed herein, the attached drawing shows one exemplary embodiment of the invention. However, it should be understood that the disclosed subject matter is not limited to the precise components shown in the drawing, wherein:

FIG. 1 is a schematic representation of a system for reducing an amount of gaseous elemental mercury emitted in a flue gas in a WFGD system.

DETAILED DESCRIPTION

In one aspect of the invention, mercury emissions and re-emissions are reduced in WFGD systems. Mercury re-emissions control additives (MECAs) are added to the aqueous/alkaline slurry that is used to scrub the flue gas in the system. The feed of MECAs to the system is correlated to the sulfite measured in the aqueous/alkaline slurry.

Turning to FIG. 1 of the drawings, there is shown a WFGD system 2 located downstream from a boiler, not shown, of the type adapted to burn a carbonaceous fuel such as coal. Combustion of the fuel produces a flue gas 6 that is admitted to WFGD housing 4 at inlet 8. The flue gas typically includes acid gases, heavy metals, and particles and the like. In the WFGD, the flue gas is scrubbed by an aqueous alkaline solution 10 that is circulated with the help of pump 14 through slurry duct 12 to nozzle sprayers 16 in the upper portions of the WFGD housing.

The slurry 10 acts to reduce contaminants such as sulfur oxides from the flue gas and may dissolve a portion of the gaseous ionic mercury species present in the flue gas to remove or reduce the gaseous mercury species from the flue gas to produce a cleaned flue gas 18 that exits from the outlet provided at the top of the housing 4. From the outlet, the cleaned flue gas may flow to a stack (not shown) or to another emissions control apparatus (not shown).

As shown, a sulfite sensor 20 is provided in the aqueous/alkaline slurry in the reservoir defined by the bottom portion of housing 4. In practice, the sensor 20 may be located external to the reservoir with a sample stream of the slurry, such as 1050 gpm, being fed to a sample sink where the sulfite level is measured. The sensor 20 measures sulfite concentration in the reservoir on a periodic or continuous basis. The sensor sends a signal 26 via RF or electrical transmission means to control device 22. The signal indicates the amount of sulfite existing in the aqueous/alkaline slurry. The control device may be a computer, a microprocessor, or other device capable of receiving electrical signals, storing data indicated by the signals 26, and performing mathematical and/or logic functions on the data contained in the signals 26. The control device 22 is operatively associated with a memory 24.

The control device compares the measured sulfite concentration to one or more predetermined sulfite concentration values which may be stored in memory 24 and then, as per U.S. Pat. No. 8,828,341, incorporated by reference herein, compares the measured sulfite concentration to the predetermined values to regulate the amount of oxidation air that is admitted to the WFGD system. In one embodiment set forth in aforementioned U.S. Pat. No. 8,828,341, the controller sends a signal 28 to blower 29 so as to adjust the amount of air or other oxygen source 30 that is admitted to the system through input duct 32.

In accordance with one aspect of the instant invention, the sulfite monitor 20 signal and associated sulfite concentration data are also used to control the amount of MECA that will be fed to the recirculating aqueous/alkaline slurry of the WFGD system to scrub the flue gas from the boiler or other combustion source. More specifically, after comparison is made between sulfite concentration in the slurry 10 and the predetermined values, a signal 34 is sent by the controller 22 to adjust a WFGD system parameter to reduce mercury emission or re-emission in the cleaned flue gas.

For example, controller 22 may send a signal to pump 38 that is operatively connected to reservoir 36 containing the MECA. In response to the signal 34 sent by controller 22, the amount of MECA sent to the recirculating aqueous/alkaline slurry is determined and controlled. MECA can be fed directly to the slurry reservoir via actuation of valve 40 to line 44 and/or MECA can be fed via chemical feed line 42 to the slurry duct 12.

As shown in FIG. 1, a mercury monitor 46 can be positioned proximate the outlet from the WFGD system to measure mercury emission/re-emission levels. Mercury measurement device 46 may be any device suitable to measure elemental mercury emitted from the scrubber. Examples include but are not limited to continuous emission monitors (CEMs) such as cold-vapor atomic absorption spectrometry (CVAAS), cold-vapor atomic fluorescence spectrometry (CVAFS), in-situ ultraviolet differential optical absorption spectroscopy (UVDOAS), and atomic emission spectrometry (AES). The monitor transmits signal 48 that is received by controller 22. The signal 48 is indicative of the amount of mercury contained within the scrubber flue gas 18. This signal is received by the controller 22 and may be compared to a predetermined mercury concentration standard or the like. As a result, MECA feed and/or oxidation air feed to the WFGD system may be adjusted, if desired.

In accordance with the U.S. Pat. No. 8,828,341, predetermined sulfite concentration values may be from 300 mg/l to about 500 mg/l or from 25 mg/l to about 150 m/l. By predetermined, it is meant that the value is determined before the comparison is made with the actual sulfite concentration as measured by monitor 20. The actual value(s) are compared to the predetermined values and remedial action in the adjustment of the flow of oxygen containing gas and MECA to the WFGD system is made.

In one aspect of the instant invention, actual sulfite concentration is compared to predetermined sulfite concentration levels to adjust the amount of MECA fed to the scrubber liquid that washes the flue gas and is recirculated in the system. It has been shown that mercury emissions are reduced when a small residual sulfite concentration is maintained in the slurry (e.g., 5-100 pm). However, if the plant is varying load or fuel sulfur level and the oxidation air cannot be modulated down to a low enough feedrate when the plant is operating at low load/low sulfur, the sulfite residual can be lost (sulfite concentration goes to 10 ppm or down to 0 as oxidation occurs). When this happens, mercury emissions can increase, and thus the feedrate of MECA is increased to limit mercury emissions.

Mercury re-emission control additives (MECAs) either chelate with the mercury, adsorb same, or cause the mercury to partition to the solid phase in order to decrease mercury re-emission. The MECAs are commercially available through a variety of sources. A myriad of differing MECAs can be used in accordance with the present invention provided they function to reduce and/or prevent mercury re-emission from combustion processes, and in particular, scrubber liquors. U.S. Pat. No. 8,632,742 lists many acceptable MECAs. The disclosure of this patent is incorporated by reference herein.

Exemplary MECAs include poly-dithio carbamic acid compounds or other sulfur containing additives such as sodium sulfide, sodium hydrosulfide, sodium bisulfide, or a polysulfide. In some cases, the MECA may be a dialkyldithiocarbamate or a sodium salt thereof such as dimethyldithiocarbamate or diethyldithiocarbamate. Other exemplary MECAs include salts of trithiocarbamate, salts of 1,3,5-triazine-2,4,6 (1H,3H,5H)-trithizone—also known as trimercapto-S-triazine, activated carbon, dithiols, dithiolanes or a thiol having a single thiol group and either an oxygen or a hydroxyl group and salts thereof. Suitable dithiols include but are not limited to 2,3 dimercaptopropanol, dimercaptosuccinic acid, and 1,8-octanedithiol. Suitable dithiolanes include but are not limited to 1,2-dithiolane-3-valeric acid and 2-methyl 1,3dithiolane. Suitable thiols include but are not limited to mercaptoacetic acid and sodium salts thereof.

Further, in some embodiment, the MECA can comprise a water soluble ethylene dichloride ammonia polymer having a molecular weight of from 500 to 10,000 and containing from 5 to 75 mole % of dithiocarbamate salt groups to prevent reemission of mercury across a WFGD.

Exemplary MECAs also include acrylic/alkylamine polymers such as acrylic acid/alkylene amines that are modified to append known metal scavenging functionalities such as with $CS_2$. These are also detailed in U.S. Pat. No. 8,632,742.

Although the subject matter has been described and illustrated with respect to exemplary embodiments thereof, it is understood by those skilled in the art that the foregoing and various other changes, omissions, and additions may be made therein and thereto, without departing from the spirit and scope of the disclosed method and system. Accordingly, other embodiments are within the scope of the following appended claims.

What is claimed is:

1. A method for reducing mercury emission or re-emission levels in combustion flue gas comprising:
    (a) supplying a combustion flue gas to a WFGD system for contact with an aqueous alkaline slurry to reduce contaminants from the flue gas to produce a cleaned flue gas;
    (b) measuring a sulfite concentration of the aqueous alkaline slurry using a sulfite sensor in operative association with the WFGD system and comparing it to a predetermined sulfite concentration level;
    (c) adjusting an amount of MECA fed to said slurry in response to said comparison made in (b).

2. The method as recited in claim 1, wherein said adjusting step (c) comprises regulating feed of said MECA to a reservoir containing said aqueous/alkaline slurry.

3. The method as recited in claim 1, wherein said adjusting step (c) comprises regulating feed of said MECA to a slurry duct in fluid communication with nozzles positioned in said WFGD system to spray said aqueous alkaline slurry into contact with said combustion flue gas.

4. The method as recited in claim 1, wherein said step of measuring sulfite concentration (b) comprises measuring sulfite concentration in said aqueous alkaline slurry.

5. The method as recited in claim 1, wherein said predetermined sulfite concentration is between 10 and 70 ppm sulfite.

6. The method as recited in claim 1, wherein said predetermined sulfite level is between about 20 to 50 ppm sulfite.

7. The method as recited in claim 1, wherein said predetermined sulfite level is 10 ppm or less.

8. The method as recited in claim 1, further comprising measuring mercury content of said flue gas and regulating MECA fed to said slurry in response to said measured mercury content.

9. A method for reducing mercury emissions or re-emission levels in combustion flue gas comprising:
    (a) supplying a combustion flue gas to a WFGD system for contact with an aqueous alkaline slurry to reduce contaminants from the flue gas to produce a cleaned flue gas;
    (b) measuring a sulfite concentration of the aqueous alkaline slurry using a sulfite sensor in operative association with the WFGD system and comparing it to a first predetermined sulfite concentration level;
    (c) adjusting an amount of oxidation air fed to the WFGD system in response to said comparison to said first predetermined sulfite concentration parameter made in (b);
    (d) providing a second predetermined sulfite concentration level correlated to a desired amount of MECA in said slurry;
    (e) comparing said sulfite concentration to said second predetermined sulfite concentration level; and
    (f) adjusting an amount of MECA fed to said slurry in response to said comparison made in (e).

10. The method as recited in claim 9, wherein said adjusting step (f) comprises regulating feed of said MECA to a reservoir containing said aqueous/alkaline slurry.

11. The method as recited in claim 9, wherein said adjusting step (f) comprises regulating feed of said MECA to a slurry duct in fluid communication with nozzles positioned in said WFGD system to spray said aqueous alkaline slurry in contact with said combustion flue gas.

12. The method as recited in claim 9, wherein said step of measuring sulfite concentration (b) comprises measuring sulfite concentration in said aqueous alkaline slurry.

13. The method as recited in claim 9, wherein said second predetermined sulfite concentration level is between about 10 and 70 ppm sulfite.

14. The method as recited in claim 9, wherein said second predetermined sulfite concentration level is between about 20 to 50 ppm sulfite.

15. The method as recited in claim 9, wherein said second predetermined sulfite concentration level is 10 ppm or less.

16. The method as recited in claim 9, further comprising measuring mercury content of said flue gas and regulating MECA fed to said slurry in response to said measured mercury content.

17. A system for reducing mercury emission or re-emission levels in a combustion flue gas comprising:
    (a) a WFGD system having an aqueous alkaline slurry therein for contacting a combustion flue gas flowing through said WFGD system;
    (b) a slurry reservoir for collecting the aqueous alkaline slurry following contact with the combustion flue gas;
    (c) a sulfite monitor operatively associated with said reservoir for measuring sulfite concentration of said aqueous alkaline slurry to obtain a measured sulfite concentration;
    (d) a control device receiving a signal from said sulfite monitor corresponding to said measured sulfite concentration and adapted to compare said measured sulfite concentration measurement to a predetermined sulfite concentration that is correlated to a desired amount of MECA in said aqueous alkaline slurry;
    (e) a MECA feed mechanism controlled by said control device to adjust the feed of MECA to said aqueous alkaline slurry in response to comparison of said measured sulfite concentration to said predetermined sulfite concentration.

18. The system as recited in claim 17, wherein said MECA feed mechanism comprises a pump in fluid communication with a MECA reservoir and said slurry reservoir for pumping MECA from said MECA reservoir to said slurry reservoir.

19. The system as recited in claim 17, wherein MECA feed mechanism comprises a slurry duct in fluid communication with spray nozzles to spray MECA into contact with said combustion flue gas flowing through said WFGD system, said MECA feed system further comprising a pump in fluid communication with said MECA reservoir and said slurry duct for pumping MECA from said MECA reservoir to said slurry duct.

20. The system as recited in claim 17, further comprising a mercury monitor operatively associated with said flue gas for measuring mercury content of said flue gas, said control device also receiving a signal from said mercury monitor, said MECA mechanism also adjusting feed of said MECA to said aqueous slurry in response to measured mercury content.

21. A system for reducing mercury emission or re-emission levels in a combustion flue gas comprising:
(a) a WFGD system having an aqueous alkaline slurry therein for contacting a combination flue gas flowing through said WFGD system;
(b) a slurry reservoir for collecting the aqueous alkaline slurry following contact with the combustion flue gas;
(c) a sulfite monitor operatively associated with said reservoir for measuring sulfite concentration of said aqueous alkaline slurry to obtain a measured sulfite concentration;
(d) a control device receiving a signal from said sulfite monitor corresponding to said measured sulfite concentration and adapted to compare said measured sulfite concentration measurement to a first predetermined sulfite concentration that is correlated to a desired amount of oxidation air fed to said WFGD system, said control device also adapted to compare said measured sulfite concentration measurement to a second predetermined sulfite concentration that is correlated to a desired amount of MECA in said aqueous alkaline slurry;
(e) an oxidation air feed mechanism controlled by said control device to adjust the feed of oxidation air to said WFGD system in response to comparison of said measured sulfite concentration measurement to said first predetermined sulfite concentration; and
(f) a MECA feed mechanism controlled by said control device to adjust the feed of MECA to said aqueous alkaline slurry in response to comparison of said measured sulfite concentration to said second predetermined sulfite concentration.

22. The system as recited in claim 21, wherein said MECA feed mechanism comprises a pump in fluid communication with a MECA reservoir and said slurry reservoir for pumping MECA from said MECA reservoir to said slurry reservoir.

23. The system as recited in claim 21, wherein MECA feed mechanism comprises a slurry duct in fluid communication with spray nozzles to spray MECA into contact with said combustion flue gas flowing through said WFGD system, said MECA feed system further comprising a pump in fluid communication with a MECA reservoir and said slurry duct for pumping MECA from said MECA reservoir to said slurry duct.

24. The system as recited in claim 21, further comprising a mercury monitor operatively associated with said flue gas for measuring mercury content of said flue gas, said control device also receiving a signal from said mercury monitor, said MECA feed mechanism also adjusting feed of said MECA to said aqueous slurry in response to measured mercury content.

* * * * *